United States Patent [19]

Schneider et al.

[11] Patent Number: 5,628,521

[45] Date of Patent: May 13, 1997

[54] MANUALLY OPERATED VEHICLE LEVELING SYSTEM

[75] Inventors: Robert H. Schneider; Jon D. Jacobs, both of Beaver Dam, Wis.

[73] Assignee: Versa Technologies, Inc., Racine, Wis.

[21] Appl. No.: 97,107

[22] Filed: Jul. 26, 1993

[51] Int. Cl.$^6$ ....................................................... B60S 9/00
[52] U.S. Cl. ........................... 280/6.1; 267/179; 280/6.12; 280/840
[58] Field of Search ....................... 280/6.1, 840, 6.12, 280/6.11, DIG. 1; 267/179; 254/93 VA, 93 RUS

[56] References Cited

U.S. PATENT DOCUMENTS

| | | | |
|---|---|---|---|
| 935,982 | 10/1909 | Herbert et al. | 267/179 |
| 1,665,762 | 4/1928 | Waream | 267/179 |
| 3,404,899 | 10/1968 | Vogel. | |
| 3,669,409 | 6/1972 | Eranosian. | |
| 3,817,493 | 6/1974 | Hanser. | |
| 3,885,813 | 5/1975 | Kern. | |
| 3,901,532 | 8/1975 | Hornagold. | |
| 4,044,999 | 8/1977 | Dodgen. | |
| 4,053,073 | 10/1977 | Franchin. | |
| 4,061,309 | 12/1977 | Hanser. | |
| 4,067,543 | 1/1978 | Orth et al.. | |
| 4,071,147 | 1/1978 | Hornagold. | |
| 4,082,249 | 4/1978 | Valdespino et al.. | |
| 4,084,830 | 4/1978 | Daniel, Jr. et al.. | |
| 4,165,861 | 8/1979 | Hanser. | |
| 4,174,094 | 11/1979 | Valdespino et al.. | |
| 4,216,939 | 8/1980 | Valdespino. | |
| 4,558,886 | 12/1985 | Straub. | |
| 4,597,584 | 7/1986 | Hanser. | |
| 4,641,843 | 2/1987 | Morrisroe. | |
| 4,678,041 | 7/1987 | Staudinger. | |
| 4,743,037 | 5/1988 | Hanser. | |
| 4,746,133 | 5/1988 | Hanser et al.. | |
| 4,784,400 | 11/1988 | Hofius. | |
| 4,815,711 | 3/1989 | Bruno et al.. | |
| 4,865,295 | 9/1989 | Halloway. | |
| 4,887,840 | 12/1989 | Harara et al.. | |
| 4,974,861 | 12/1990 | Itoh et al.. | |
| 5,013,011 | 5/1991 | Halloway. | |
| 5,176,391 | 1/1993 | Schneider et al.. | |
| 5,188,379 | 2/1993 | Krause et al. | 280/6.12 |

FOREIGN PATENT DOCUMENTS

| | | | |
|---|---|---|---|
| 19411 | 4/1929 | Australia | 254/93 VA |
| 222381 | 8/1958 | Australia. | |
| 1678650 | 9/1991 | U.S.S.R. | 280/6.12 |

*Primary Examiner*—Eric D. Culbreth
*Attorney, Agent, or Firm*—Andrus, Sceales, Starke & Sawall

[57] ABSTRACT

A manually operated leveling system for a vehicle such as a recreational vehicle or the like includes three jacks in the form of hydraulic cylinders mounted to the vehicle frame. A shoe is mounted to the piston rod of each jack. Two jacks are located adjacent the rear of the vehicle and one jack is located adjacent the front of the vehicle. A series of manually actuated switches, oriented in a diamond pattern, are located within the interior of the vehicle, and are interconnected with the jacks to provide selective extension of the jacks in order to adjust the attitude of the vehicle relative to level. A cross-check level or bullseye level is mounted within the interior of the vehicle for viewing by the operator to determine the attitude of the vehicle relative to level. A series of control valves are interposed between the jacks and the switches for controlling extension and retraction of the jacks in response to manual operation of the switches. A unique jack construction allows the jacks to be mounted to the frame in any satisfactory location while preventing interference of the jack springs with portions of the vehicle's undercarriage adjacent the frame.

5 Claims, 2 Drawing Sheets

MANUALLY OPERATED VEHICLE LEVELING SYSTEM

BACKGROUND AND SUMMARY

This invention relates to a leveling system for use with a vehicle, such as a recreational vehicle.

Various systems are known for leveling a vehicle such as a recreational vehicle. Some such systems are shown in U.S. Pat. Nos. 4,061,309; 4,165,861; 4,597,584; 4,743,037; and 4,746,133. These patents all show a leveling system having four jacks located one adjacent each corner of the vehicle. Schneider et al U.S. Pat. No. 5,176,391, owned by the same assignee as the present application, discloses a vehicle leveling system having three jacks, two of which are located at the rearward end of the vehicle and one of which is located at the forward end of the vehicle.

Generally, all of the above-noted patents disclose vehicle leveling systems which are relatively complex in construction and operation, to provide automatic leveling of the vehicle in response to certain operator commands.

It is an object of the present invention to provide a manually operated vehicle leveling system which is relatively simple in its components, installation and operation. A further object of the invention is to provide a unique jack construction which is especially suitable for use in a vehicle leveling system such as is contemplated by the invention.

In accordance with one aspect of the invention, a vehicle leveling system includes a series of extendible and retractable jacks mounted to the frame of the vehicle, a manually operated actuator mechanism located within the vehicle interior, and a power system interposed between the jacks and the manually operated actuator mechanism for selectively extending and retracting the jacks. The series of jacks includes first and second jacks located toward one end of the vehicle and a third jack located toward the opposite end of the vehicle. The manually operated actuator mechanism includes a series of switches disposed in a diamond pattern relative to the longitudinal axis of the vehicle. The switches may be in the form of four manually actuated switches mounted to a panel located in the interior of the vehicle. A level sensing device is located in the vehicle interior to provide a visual indication to the operator of the attitude of the vehicle relative to level.

Each jack is preferably in the form of a hydraulic cylinder assembly including a cylinder and an extendible and retractable piston mounted to the cylinder. A spring is interposed between the cylinder and the piston. Introduction of pressurized fluid into the cylinder causes extension of the piston against the force of the spring, and the spring causes retraction of the piston when fluid pressure within the cylinder is relieved. A shoe is connected to the extendible and retractable piston, and the spring is preferably interconnected between the cylinder and the shoe. The power system is preferably a fluid power system consisting of a hydraulic fluid reservoir, a pump for selectively supplying fluid under pressure to the jacks from the reservoir, and a control valve interposed between the hydraulic fluid reservoir and each jack. Each control valve controls the supply of pressurized fluid to one or more of the jacks during operation of the pump, and also provides flow of fluid to the reservoir when the pump is not operating. The control valves are responsive to operation of the manually actuated switches for selectively adjusting the attitude of the vehicle relative to level in response to manual actuation by the operator. Each control valve is interconnected with a single return line interconnected with the reservoir, and a return control valve is disposed in the return line for controlling flow of fluid from the jacks to the reservoir. The return control valve is responsive to a manually operated retract switch actuable by the operator and located within the interior of the vehicle.

The invention further contemplates a unique jack construction for use in the vehicle leveling system of the invention. A plate is interconnected with the hydraulic cylinder of each jack toward the upper end of the cylinder. The spring is interconnected between the plate and the piston, preferably having its lower end mounted to the shoe to which the piston is connected. A connector arrangement is interposed between the spring and the plate for securing the spring to the plate. The connector arrangement is preferably in the form of a tapered passage provided in the upper end of the spring, which decreases in transverse dimension in a bottom-to-top direction, a plug having a tapered wall disposed within the tapered passage and engaging the spring, and a connector extending between the plate and the plug. The plate is mounted to the upper end of the cylinder so as to be selectively pivotable relative thereto. In this manner, the spring can be placed in any desired position relative to the vehicle frame once the cylinder is mounted to the frame in order to avoid any obstructions which may be present in the vicinity of the frame.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
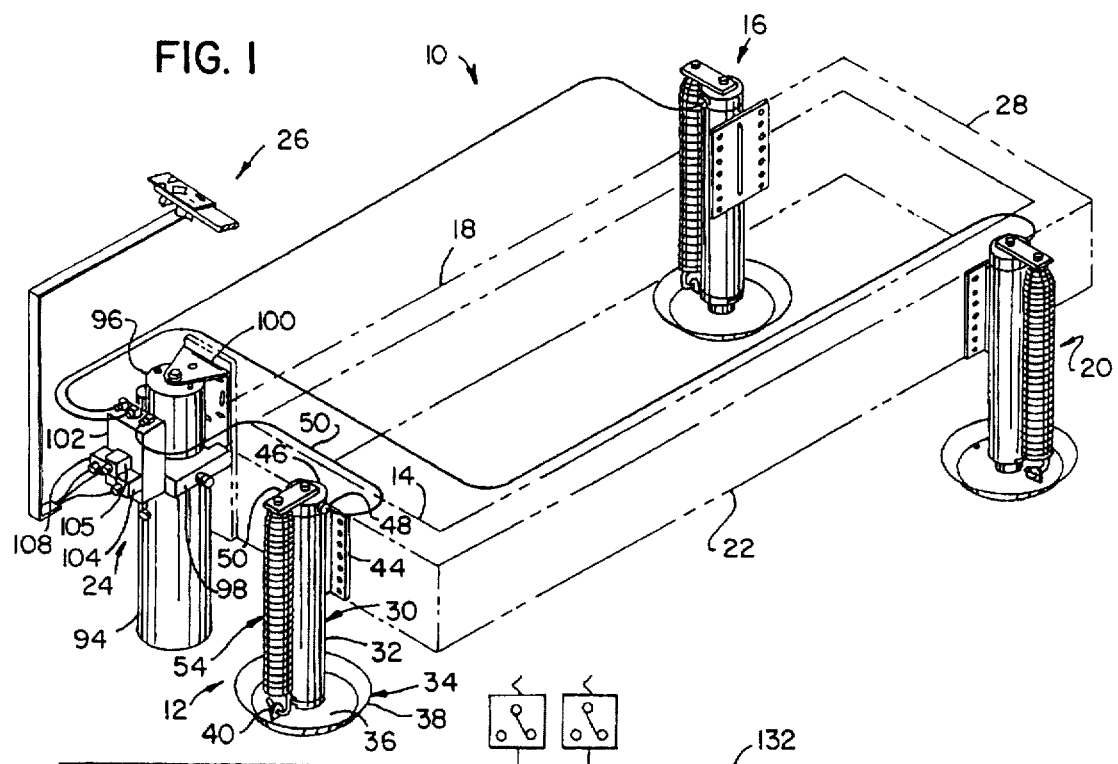
FIG. 1 is an isometric view of the vehicle leveling system constructed according to the invention as installed on the frame of a vehicle such as a recreational vehicle.

Referring to FIG. 1, a vehicle leveling system 10 constructed according to the invention is mounted on the frame members of a vehicle, such as a recreational vehicle or the like. System 10 includes a front jack assembly 12 mounted to the forward transverse frame member 14 of the vehicle, a passenger side rear jack assembly 16 mounted toward the rearward end of passenger side longitudinal frame member 18, a driver side rear jack assembly 20 mounted toward the rearward end of driver side longitudinal frame member 22, a reservoir, pump and actuator assembly 24 mounted to front transverse frame member 14, and a manually operated control panel 26 mounted within the interior of the vehicle. Rear jack assemblies 16, 20 are mounted just forwardly of a rear transverse frame member 28 which interconnects the rearward ends of longitudinal frame members 18, 22. Front jack assembly 12 is mounted approximately at the midpoint of front transverse frame member 14. This arrangement provides a stable three-point leveling system for adjusting the attitude of the vehicle relative to level.

Jack assemblies 12, 16 and 20 are identical in construction. The construction of jack assembly 12 will be explained in detail with reference to FIGS. 1-3, with the understanding that such explanation applies with equal force to jack assemblies 16, 20.

Figure 2:
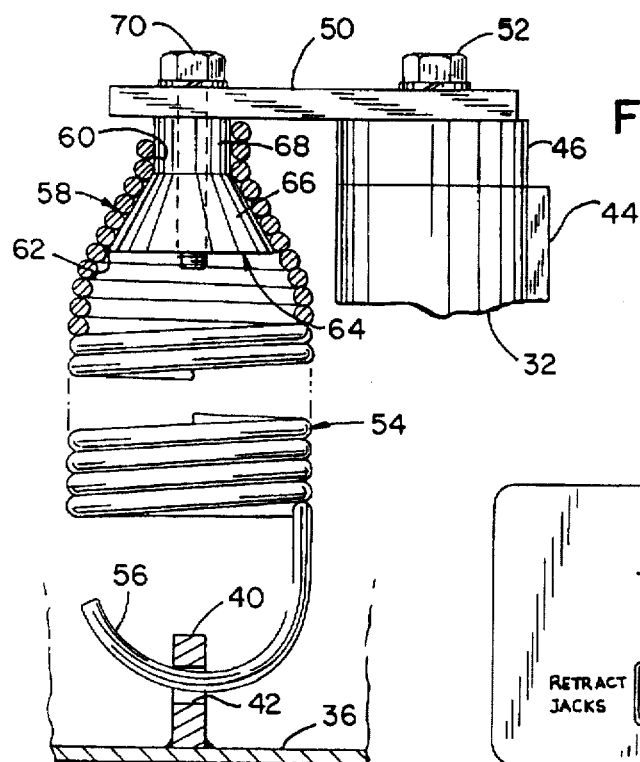
FIG. 2 is a partial side elevation view, with portions in section, showing the interconnection of the spring with the cylinder and shoe of each jack in the leveling system of FIG. 1.
Figure 3:
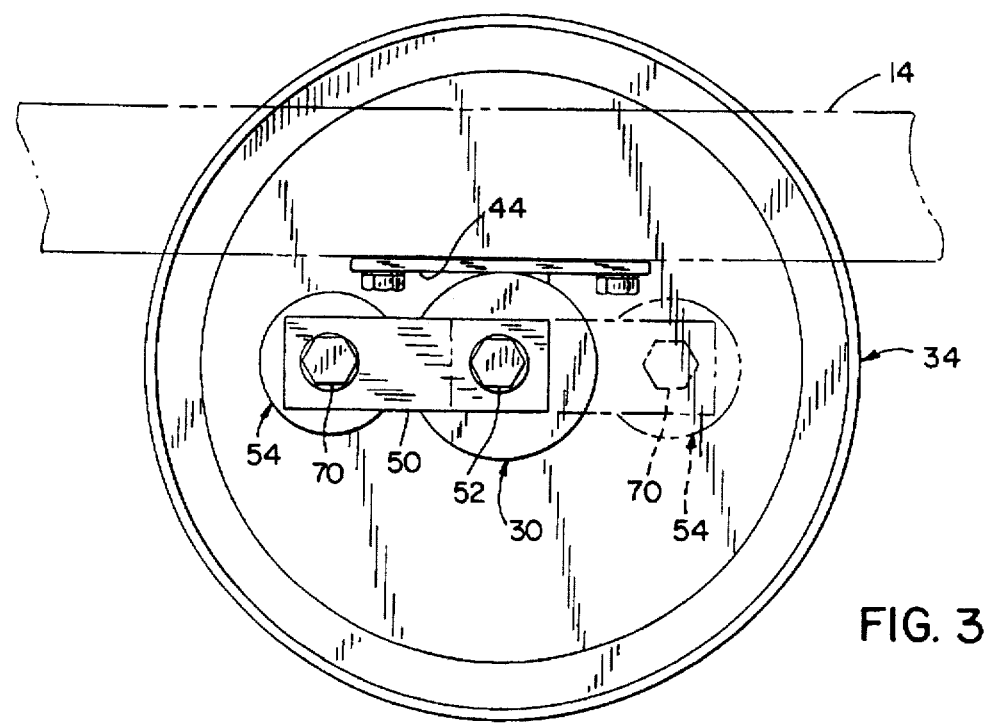
FIG. 3 is a top plan view of the jack of FIG. 2.

As shown in FIGS. 1-3, jack assembly 12 consists of a hydraulic cylinder assembly 30 including a cylinder 32 having a piston movably mounted within its interior. A piston rod (not shown) is mounted to the piston, and a shoe 34 is mounted to the end of the piston rod in a conventional manner. Shoe 34 includes a circular bottom wall 36 and an upstanding annular angled side wall 38. A tab 40 having an opening 42 (FIG. 2) is mounted to the upper surface of shoe bottom wall 36.

A mounting plate 44 is connected to the upper end of cylinder 32. Plate 44 is provided with a series of vertically spaced openings adjacent its side edges, which are adapted to receive bolts or the like to mount cylinder 32 to frame member 14.

Cylinder assembly 30 further includes a top cap 46 mounted to the upper end of cylinder 32 having a fitting 48 (FIG. 1) to which a hydraulic fluid line 50 is connected for selectively supplying pressurized fluid to cylinder 32 from reservoir, pump and actuator assembly 24 and for providing return flow of fluid from cylinder 32 to assembly 24. Cap 46 further includes a central, threaded vertical passage opening onto its top surface.

A mounting plate 50 is connected to cap 46 through a threaded connector 52 which extends through an opening formed toward one end of plate 50 and into threaded engagement with the threaded passage formed in cap 46.

A spring 54 extends between plate 50 and shoe 34. Spring 54 has a hook 56 at its lower end, which extends through opening 42 in tab 40 to secure the lower end of spring 54 to shoe 34. Spring 54 is formed so as to provide a tapered upper end section 58 defining an upwardly facing opening, a vertical passage 60 defined by the uppermost coils of spring 54, and a tapered passage 62 which extends between vertical passage 60 and the straight-sided vertical passage defined by the coils of spring 54 below tapered upper end section 58.

A plug member 64 is received within tapered upper end section 58 of spring 54. Plug member 64 includes a lower section defining a frustoconical outer surface 66 and a cylindrical upper section 68. A threaded passage extends along the longitudinal axis of plug member 64 between its upper and lower ends. A threaded connector 70 extends through an opening formed toward the outer end of plate 50 and into engagement with the threaded passage formed in plug member 64 for interconnecting tapered upper end subsection 58 of spring 54 with plate 50. Connector 70 is turned so as to draw the upper end of plug member 64 tight against the lower surface of plate 50 to assume its FIG. 2 position, to provide maximum pretensioning of spring 54. If desired to relieve the pretension of spring 54, connector 70 is turned in the opposite direction to move plug member 64 away from plate 50 under the influence of spring 54. Engagement of frustoconical outer surface 66 of plug member 54 with the coils of tapered upper end section 58 defining tapered passage 62 provides positive engagement between plug member 64 and spring 54. The uppermost coils of spring 54 defining vertical passage 60 further function to prevent relative movement between plug member 64 and spring 54 when plug member frustoconical surface 66 is engaged with the coils of spring 54 defining tapered passage 62.

If desired, connector 52 can be loosened to enable plate 50 to be pivoted relative to cylinder 32 throughout a range of movement of approximately 180°, as illustrated in FIG. 3, in order to allow cylinder 32 to be mounted to frame member 14 in any desired position. That is, the pivoting movement of plate 50 provided by connector 52 allows the installer to place spring 54 in any position between the range of positions illustrated in FIG. 3 in order to keep spring 54 out of the way of any obstructions which may be present on the undercarriage of the vehicle adjacent frame member 14.

Figure 4:
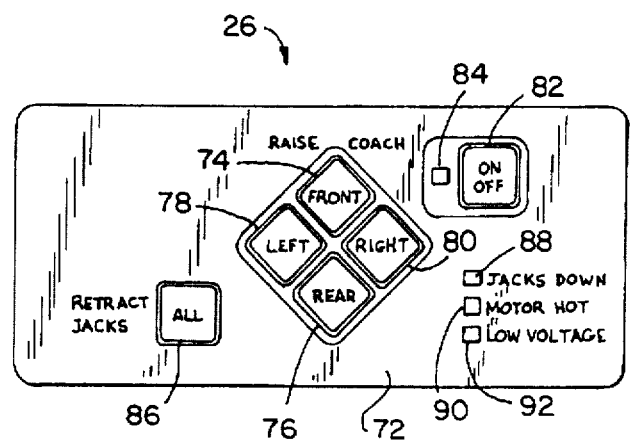
FIG. 4 is a view of the manually operated control panel for the leveling system of FIG. 1.

FIG. 4 illustrates control panel 26 in detail. Panel 26 includes a planar front wall 72 which is adapted to be mounted to the dashboard of the vehicle. A series of manually operable actuator switches are mounted to wall 72, including a front switch 74, a rear switch 76, a left switch 78 and a right switch 80. Switches 74-80 are arranged in a diamond pattern, and panel 26 is mounted to the vehicle such that the longitudinal axis of the diamond pattern formed by switches 74-80 is parallel to the longitudinal axis of the vehicle. In this manner, front switch 74 points toward the front of the vehicle, rear switch 76 points toward the rear of the vehicle, and left and right switches 78, 80 point toward the left and right sides, respectively, of the vehicle.

As an alternative to switches 74-80, it is understood that any other satisfactory manually operated actuator mechanism could be used, such as a joystick or the like.

Control panel 26 also includes a power ON/OFF switch 82 and an LED 84 adjacent thereto, and a RETRACT ALL JACKS switch 86. Panel 26 further includes a JACKS DOWN LED 88, a MOTOR HOT LED 90, and a LOW VOLTAGE LED 92.

Referring back to FIG. 1, reservoir, pump and actuator assembly 24 includes a hydraulic fluid reservoir 94 and a pump and motor assembly 96, both of which are mounted to a mounting block 98 disposed therebetween. A mounting bracket 100 is interconnected with pump and motor assembly 96 and block 98 for mounting reservoir, pump and actuator assembly 24 to frame member 14.

A valve block 102 is mounted to block 98, and a series of supply/return control valves 104, 106 and 108 are mounted to valve block 102. Supply/return control valves 104-108 are solenoid operated dual poppet bidirectional blocking valves, with a manual override, such as manufactured by Delta under its Part No. 86020151.

Figure 5:
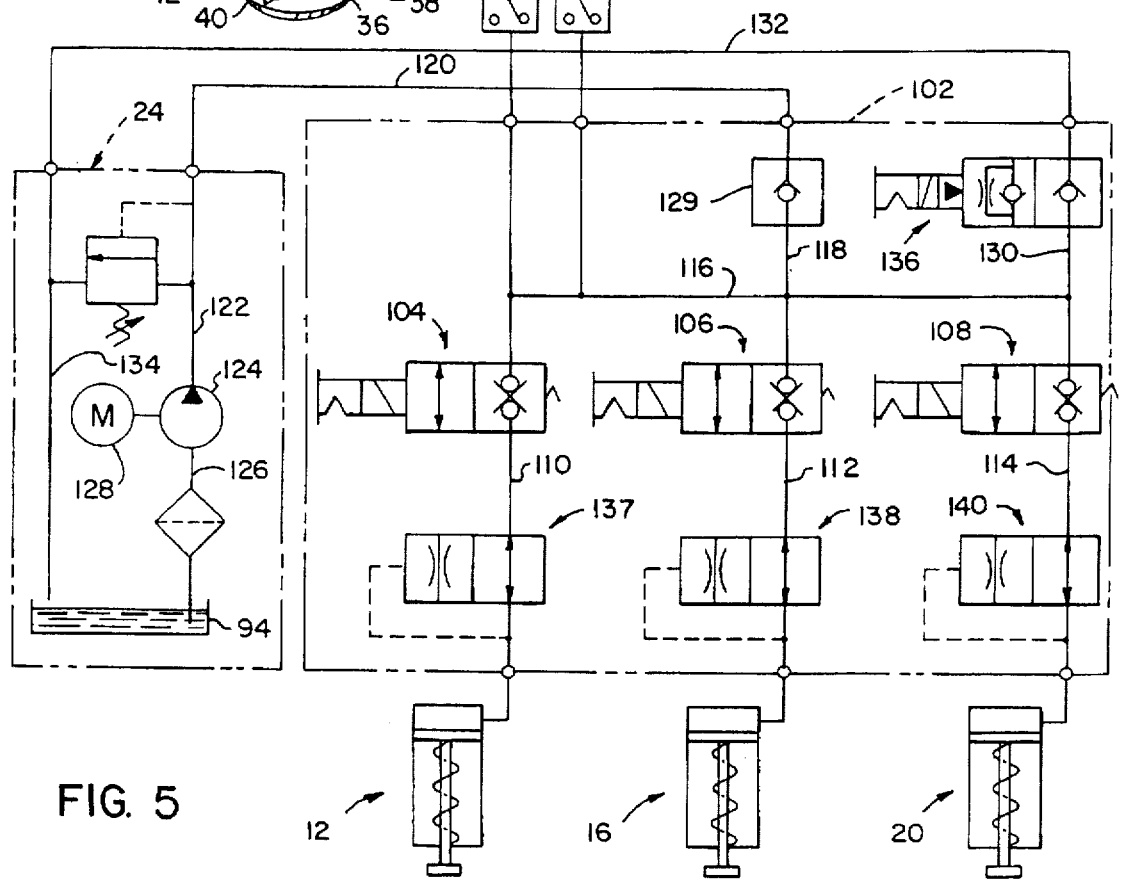
FIG. 5 is a schematic representation of the hydraulic fluid power system of the vehicle leveling system of FIG. 1.

The hydraulic fluid power system for extending and retracting jacks 12, 16 and 20 as illustrated in FIG. 5 is substantially similar to the hydraulic system as shown in Schneider et al U.S. Pat. No. 5,176,391, owned by the same assignee as the present application, the disclosure of which is hereby incorporated by reference. Similarly, the construction of reservoir, pump and actuator assembly 24 is substantially identical to the reservoir, pump and actuator assembly as disclosed in Schneider et al U.S. Pat. No. 5,176,391, and reference is made to the description contained in U.S. Pat. No. 5,176,391 for a detailed explanation of the construction of reservoir, valve and actuator assembly 24.

Referring to FIG. 5, supply/return control valves 104-108 are located in secondary supply/return passages 110, 112 and 114, respectively. Valves 104-108 each include a rightward block having a double check valve and a leftward block providing free flow therethrough. Valves 104-108 are biased toward their position shown in FIG. 5 in which their rightward blocks are located in passages 110-114, respectively. In accordance with known construction, valves 104-108 are shiftable leftwardly in response to supply of electrical current to a solenoid in response to operation of switches 74-80. In the event of an electrical failure, valves 104–108 can be manually shifted between their rightward and leftward positions.

Secondary supply/return passages 110, 112 and 114 each communicate with a primary supply/return passage 116, which in turn communicates with reservoir 94 through a passage 118 and a line 120 extending between passage 118 and a line 122 interconnected with pump 124, which forms a part of motor and pump assembly 96 (FIG. 1). Pump 124 is interconnected with reservoir 94 through a line 126, and is driven by motor 128 which forms a further part of motor and pump assembly 96.

A check valve 129 is mounted within passage 118 for providing one-way flow of fluid from pump 124 through line 120 to primary supply/return passage 116.

A return passage 130 is formed in block 102, communicating between primary supply/return passage 116 and a line 132 which interconnects with a return line 134 to provide return flow of fluid to reservoir 94 from primary supply/return passage 116. A return control valve 136 is provided in passage 134 for controlling return flow of fluid from primary supply/return passage 116 to reservoir 94. Return control valve 136 is a two-way normally closed solenoid operated poppet valve, such as is sold by Delta under its Part No. 85002351. Return control valve 136 provides a rightward block having a check valve which prevents fluid flow from primary supply/return passage 116, and a leftward block having an oppositely oriented check valve which allows flow in return passage 130 from primary supply/return passage 116 to line 132. Return control valve 136 is biased to its FIG. 5 position in which its rightward block is disposed in return passage 130. The leftward block of return valve 136 provides an alternate flow path restricting arrangement, which in this application is not used.

A series of retraction restricting valves 137, 138 and 140 are located in passages 110, 112 and 114, respectively between jacks 12, 16, 20 and supply/return control valves 104–108, respectively. Retraction restricting valves 137–140 are generally constructed in accordance with the teachings of Schneider U.S. Pat. No. 4,704,947 entitled "Bidirectional Fluid Flow Valve", owned by the same assignee as the present application, and the disclosure of which is hereby incorporated by reference. Valves 137–140 provide unrestricted flow in passages 110–114, respectively, during supply of pressurized fluid from primary supply/return passage 116 to jacks 12, 16, 20, respectively, to extend jacks 12, 16, 20. On the other hand, when fluid pressure in primary supply/return passage 116 is relieved and flow control valves 104–108 are shifted rightwardly to provide retraction of jacks 12, 16, 20, respectively, retraction restricting valves 137–140 are shifted rightwardly to provide a restriction in the return flow of fluid from jacks 12, 16, 20, respectively to primary supply/return passage 116, until pressure on jacks 12, 16 and 20 is relieved to a predetermined extent. In this application, retraction restricting valve 137 is shifted to provide slow retraction of front jack 12 until the front vehicle wheels engage the ground and relieve pressure on jack 12. When this occurs, retraction restricting valve 12 is shifted to its FIG. 5 position to eliminate the restriction in flow through valve 136 and to provide full flow of fluid thereacross in secondary supply/return line 110, to provide faster retraction of jack 12. In a similar manner, retraction restricting valves 138, 140 provide slow retraction of jacks 16, 20, respectively until the rear tire set adjacent each jack engages the ground, and thereafter fast retraction of jacks 16, 20.

Switches 74–80 are interconnected with valves 104–108 to provide selective extension of jacks 12, 16 and 20, respectively in response to operation of switches 74–80. Front switch 74 controls extension of front jack 12; rear switch 76 controls extension of rear jacks 16, 20; left switch 78 controls extension of front jack 12 and driver side rear jack 20; and right switch 80 controls operation of front jack 12 and passenger side rear jack 16.

In operation, to level the vehicle the operator first actuates power ON/OFF switch 82 to energize the system, and LED 84 is illuminated to indicate that the system is energized. The operator then views a level indicator, such as a conventional carpenter's cross-check level or a bullseye level to determine the attitude of the vehicle relative to level. If the front of the vehicle needs to be raised, the operator actuates switch 74 to extend jack 12. Similarly, the operator operates switches 76, 78 and 80 to raise either the rear side, the passenger side or the left side, respectively, of the vehicle until the vehicle has moved to a level attitude. The operator then actuates power ON/OFF switch 82 to de-energize the system.

A float switch is provided in reservoir 94 to illuminate JACKS DOWN LED 88 when any one of jacks 12, 16 or 20 is extended. MOTOR HOT LED 90 is illuminated when motor 128 has run more than a predetermined period of time, which indicates that one or more of the jacks is fully extended and has not reached the ground. LOW VOLTAGE LED 92 is illuminated if the voltage operating motor 128 falls below a predetermined level, which indicates that the motor current is above a predetermined level in order to provide protection for current overload of motor 128.

RETRACT ALL JACKS switch 86 is actuated by the operator when it is desired to move the vehicle. Switch 86 is interconnected with retract control valve 136 for shifting valve 136 rightwardly, and for simultaneously shifting valves 104–108 rightwardly, in order to provide retraction of jacks 12, 16 and 20 under the influence of the spring 54 of each jack.

As in the system disclosed in Schneider et al U.S. Pat. No. 5,176,391, the system of the present invention can only be operated when the transmission of the vehicle is engaged in its neutral or park conditions and when the parking brake is engaged. If any one of these conditions is violated, the electronics of the system automatically provide retraction of jacks 12, 16 and 20 in a manner similar to that disclosed in Schneider et al U.S. Pat. No. 5,176,391.

Various alternatives and embodiments are contemplated as being within the scope of the following claims particularly pointing out and distinctly claiming the subject matter regarded as the invention.

We claim:

1. A vehicle leveling system for a vehicle having an interior, comprising:

a series of extendible and retractable jacks mounted to the frame of the vehicle, including first and second jacks located toward one end of the vehicle and a third jack located toward the opposite end of the vehicle;

a manually operated actuator mechanism located within the vehicle interior, including a plurality of switches; and a power system interposed between the actuator mechanism and the jacks for selectively extending and retracting the jacks in response to operation of the manually operated actuator mechanism to adjust the attitude of the vehicle relative to level;

wherein each jack comprises a hydraulic cylinder assembly including a cylinder having an extendible and retractable piston; a spring interposed between the cylinder and the piston, wherein introduction of pressurized fluid into the cylinder causes extension of the piston against the force of the spring, and wherein the spring causes retraction of the piston when fluid pressure within the cylinder is relieved; a shoe connected to the piston; and a plate mounted toward the upper end of the cylinder, wherein the plate extends unidirectionally outwardly from the cylinder; wherein the upper end of the spring is mounted to the cylinder via interconnection of the plate with the upper end of the spring; wherein the plate is mounted to the upper end of the cylinder via pivotable connection structure providing selective pivoting movement of the plate relative to the cylinder; and wherein the cylinder is mounted to the vehicle via a connection arrangement separate from the pivotable connection structure, wherein the pivotable connection structure provides pivoting movement of the plate relative to the vehicle during or after mounting of the cylinder to the vehicle via the separate cylinder connection arrangement to position the spring in various locations relative to the vehicle frame in order to avoid obstructions adjacent the vehicle frame.

2. A vehicle leveling system, comprising:

a series of extendible and retractable jacks mounted to the frame of the vehicle, including first and second jacks located toward one end of the vehicle and a third jack located toward the opposite end of the vehicle, wherein each jack comprises a hydraulic cylinder assembly including a cylinder having an extendible and retractable piston, and a spring interposed between the cylinder and the piston, wherein introduction of pressurized fluid into the cylinder causes extension of the piston against the force of the spring, and wherein the spring causes retraction of the piston when fluid pressure within the cylinder is relieved;

an actuator mechanism located within the vehicle interior, including a plurality of switches; and a power system interposed between the control mechanism and the jacks for selectively extending and retracting the jacks in response to operation of the actuator mechanism to adjust the attitude of the vehicle relative to level, wherein the power system comprises a hydraulic fluid reservoir from which hydraulic fluid is supplied to the jacks, a pump, a control valve interposed between the hydraulic fluid reservoir and each jack for controlling the supply of pressurized fluid to the jacks during operation of the pump and to provide flow of fluid to the reservoir when the pump is not operating, the control valves being responsive to operation of the actuator mechanism for adjusting the attitude of the vehicle relative to level, and a retraction restricting valve interposed between at least one of the jacks and the pump, wherein a retraction restricting valve is interposed between each control valve and its associated jack, wherein the retraction restricting valve is movable between a first position providing full flow of fluid to the jack upon operation of the pump and a second position providing a restriction in fluid flow upon retraction of the jacks.

3. A vehicle leveling system, comprising:

a series of extendible and retractable jacks mounted to the frame of the vehicle, including first and second jacks located toward one end of the vehicle and a third jack located toward the opposite end of the vehicle, wherein each jack comprises a hydraulic cylinder assembly including a cylinder having an extendible and retractable piston, and a spring interposed between the cylinder and the piston, wherein introduction of pressurized fluid into the cylinder causes extension of the piston against the force of the spring, and wherein the spring causes retraction of the piston when fluid pressure within the cylinder is relieved;

an actuator mechanism located within the vehicle interior, including a plurality of switches; and a power system interposed between the control mechanism and the jacks for selectively extending and retracting the jacks in response to operation of the actuator mechanism to adjust the attitude of the vehicle relative to level, wherein the power system comprises a hydraulic fluid reservoir from which hydraulic fluid is supplied to the lacks, a pump, a control valve interposed between the hydraulic fluid reservoir and each lack for controlling the supply of pressurized fluid to the jacks during operation of the pump and to provide flow of fluid to the reservoir when the pump is not operating, the control valves being responsive to operation of the actuator mechanism for adjusting the attitude of the vehicle relative to level, and a retraction restricting valve interposed between at least one of the jacks and the pump, wherein the retraction restricting valve is movable between a first position providing full flow of fluid to the jack upon operation of the pump and a second position providing a restriction in fluid flow upon retraction of the jacks, wherein each retraction restricting valve is movable to its first position during retraction of its associated jack under the weight of the vehicle, and is movable to its second position during retraction when the weight of the vehicle on its associated jack is relieved to expedite jack retraction.

4. A method of operating a vehicle leveling system, comprising the steps of:

mounting a series of jacks to the vehicle, wherein each jack is movable between a retracted position and an extended position in which the jack is engaged with the ground; and moving the jacks to their retracted positions after engagement of the jacks with the ground, wherein at least one of the jacks is moved to its retracted position by first retracting the jack at a first, relatively slow rate until the weight of the vehicle on the jack is relieved, and then retracting the jack at a second rate faster than the first, slow rate toward its retracted position.

5. A vehicle leveling system, comprising:

a series of jacks mounted to the vehicle, wherein each jack is movable between a retracted position and an extended position in which the jack is engaged with the ground; and a jack retraction system for moving the jacks to their retracted positions after engagement of the jacks with the ground, wherein the jack retraction system includes means for moving at least one of the jacks to its retracted position at a first, relatively slow rate until the weight of the vehicle on the jack is relieved, and for retracting the jack at a second rate faster than the first, slow rate toward its retracted position when the weight of the vehicle on the jack is relieved.

* * * * *

UNITED STATES PATENT AND TRADEMARK OFFICE
CERTIFICATE OF CORRECTION

PATENT NO. : 5,628,521

DATED : May 13, 1997

INVENTOR(S) : ROBERT H. SCHNEIDER ET AL

It is certified that error appears in the above-identified patent and that said Letters Patent is hereby corrected as shown below:

In The Claims

Claim 3, col. 8, line 17, delete "lacks" and substitute therefor -- jacks --; Claim 3, col. 8, line 18, delete "lack" and substitute therefor -- jack --.

Signed and Sealed this

Nineteenth Day of August, 1997

*Attest:*

BRUCE LEHMAN

*Attesting Officer*     *Commissioner of Patents and Trademarks*